US012585277B2

(12) United States Patent
Davis

(10) Patent No.: US 12,585,277 B2
(45) Date of Patent: Mar. 24, 2026

(54) OFF-ROAD MACHINE-LEARNED OBSTACLE NAVIGATION IN AN AUTONOMOUS VEHICLE ENVIRONMENT

(71) Applicant: Deere & Company, Moline, IL (US)

(72) Inventor: Travis J. Davis, Polk City, IA (US)

(73) Assignee: Deere & Company, Moline, IL (US)

( * ) Notice: Subject to any disclaimer, the term of this patent is extended or adjusted under 35 U.S.C. 154(b) by 127 days.

(21) Appl. No.: 18/413,342

(22) Filed: Jan. 16, 2024

(65) Prior Publication Data

US 2024/0152150 A1 May 9, 2024

Related U.S. Application Data

(62) Division of application No. 16/953,774, filed on Nov. 20, 2020, now Pat. No. 11,906,974.

(51) Int. Cl.
*G05D 1/00* (2024.01)
*G05D 1/249* (2024.01)
(Continued)

(52) U.S. Cl.
CPC ......... *G05D 1/0238* (2013.01); *G05D 1/0223* (2013.01); *G05D 1/0246* (2013.01);
(Continued)

(58) Field of Classification Search
CPC .............. G05D 1/0238; G05D 1/0223; G05D 1/0246; G05D 1/249; G05D 1/628; G05D 1/65; G05D 1/0248; G05D 2201/0201; G05D 2201/0202; G05D 1/0088; G05D 1/0214; G05D 1/0221; G06F 18/24; G06N 3/02; G06V 20/58; G06V 20/64; G06V 10/70; G06V 10/82; G06V 20/60;
(Continued)

(56) References Cited

U.S. PATENT DOCUMENTS

| | | |
|---|---|---|
| 2016/0312446 A1 | 10/2016 | Pettersson et al. |
| 2017/0166123 A1 | 6/2017 | Bahgat et al. |

(Continued)

OTHER PUBLICATIONS

European Patent Office, Extended European Search Report and Written Opinion, European Patent Application No. 21203474.8, Apr. 8, 2022, 9 pages.

(Continued)

*Primary Examiner* — Bao Long T Nguyen
(74) *Attorney, Agent, or Firm* — Fenwick & West LLP

(57) ABSTRACT

An autonomous off-road vehicle, upon encountering an obstruction while navigating a route, can apply a first machine-learned model to identify the obstruction. In the event that the first machine-learned model cannot identify the obstruction, the autonomous off-road vehicle can apply a second machine-learned model configured to determine whether or not the obstruction can be ignored, for instance based on dimensions of the obstruction. If the obstruction can be ignored, the autonomous off-road vehicle can continue navigating the route. If the obstruction cannot be ignored, the autonomous off-road vehicle can modify the route, can stop, can flag the obstruction to a remote human operator, can modify an interface of a human operator to display a notification or a video feed from the vehicle, and the like.

20 Claims, 5 Drawing Sheets

(51) Int. Cl.
| | |
|---|---|
| *G05D 1/628* | (2024.01) |
| *G05D 1/65* | (2024.01) |
| *G06F 18/24* | (2023.01) |
| *G06N 3/02* | (2006.01) |
| *G06V 20/58* | (2022.01) |
| *G06V 20/64* | (2022.01) |

(52) U.S. Cl.
CPC ............. *G05D 1/249* (2024.01); *G05D 1/628* (2024.01); *G05D 1/65* (2024.01); *G06F 18/24* (2023.01); *G06N 3/02* (2013.01); *G06V 20/58* (2022.01); *G06V 20/64* (2022.01)

(58) Field of Classification Search
CPC ................. G06K 9/6267; G01S 7/417; B60W 30/0956; G06T 2207/20084; G06T 2207/20081; G06T 2207/30252; G06T 2207/30261; G06T 2207/10028
See application file for complete search history.

(56) References Cited

U.S. PATENT DOCUMENTS

| | | | |
|---|---|---|---|
| 2017/0185850 A1* | 6/2017 | Hsu ...................... | G05D 1/0246 |
| 2017/0191243 A1 | 7/2017 | Sharp et al. | |
| 2018/0032078 A1 | 2/2018 | Ferguson et al. | |
| 2019/0146511 A1 | 5/2019 | Hurd et al. | |
| 2020/0326715 A1 | 10/2020 | Hurd et al. | |
| 2020/0334551 A1 | 10/2020 | Javidi et al. | |

OTHER PUBLICATIONS

United States Office Action, U.S. Appl. No. 16/953,774, filed Jun. 16, 2023, 37 pages.
United States Office Action, U.S. Appl. No. 16/953,774, filed Jan. 3, 2023, 29 pages.

\* cited by examiner

100

Figure 4:
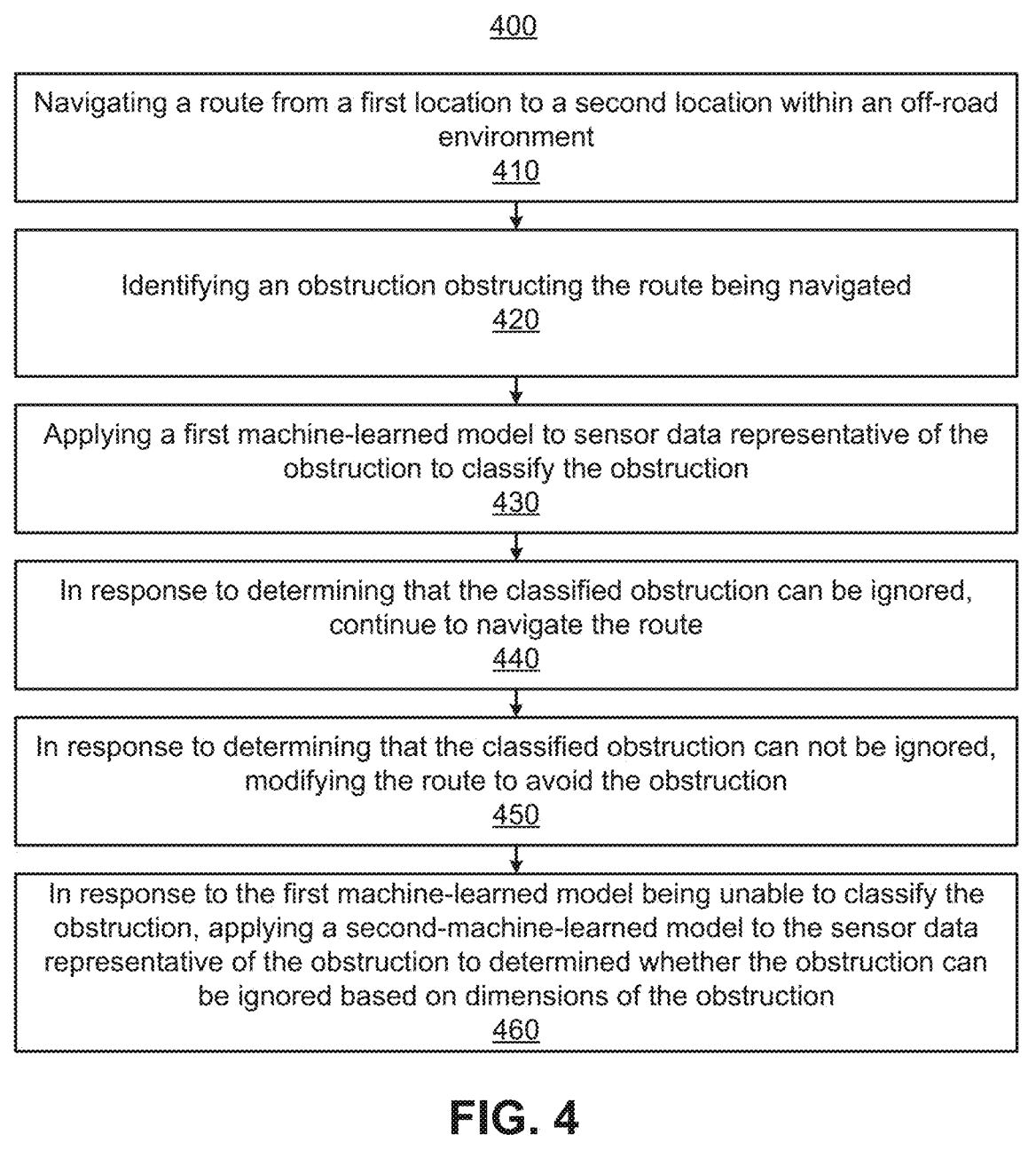

400

Navigating a route from a first location to a second location within an off-road environment
410

Identifying an obstruction obstructing the route being navigated
420

Applying a first machine-learned model to sensor data representative of the obstruction to classify the obstruction
430

In response to determining that the classified obstruction can be ignored, continue to navigate the route
440

In response to determining that the classified obstruction can not be ignored, modifying the route to avoid the obstruction
450

In response to the first machine-learned model being unable to classify the obstruction, applying a second-machine-learned model to the sensor data representative of the obstruction to determined whether the obstruction can be ignored based on dimensions of the obstruction
460

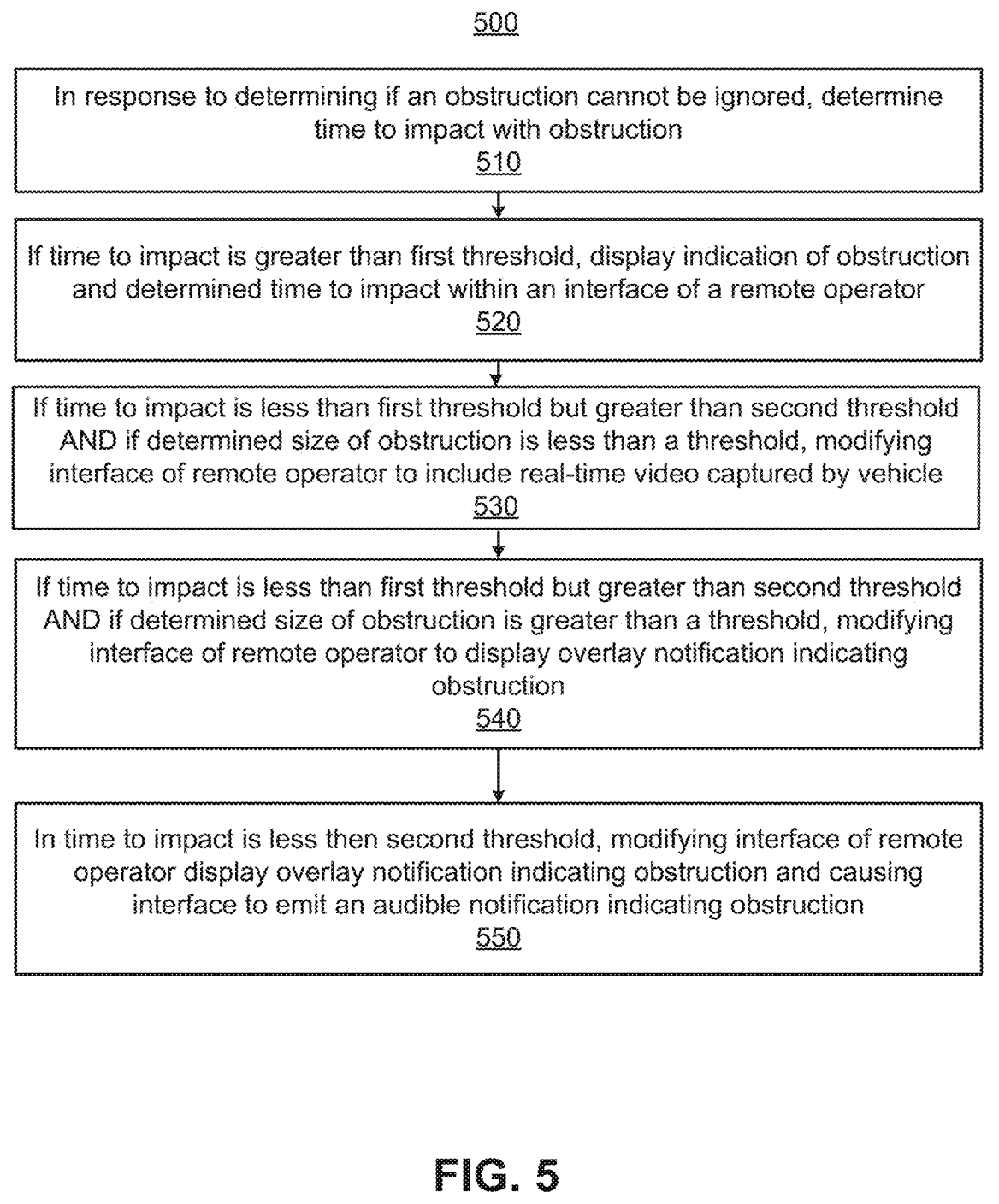

In response to determining if an obstruction cannot be ignored, determine
time to impact with obstruction
510

If time to impact is greater than first threshold, display indication of obstruction
and determined time to impact within an interface of a remote operator
520

If time to impact is less than first threshold but greater than second threshold
AND if determined size of obstruction is less than a threshold, modifying
interface of remote operator to include real-time video captured by vehicle
530

If time to impact is less than first threshold but greater than second threshold
AND if determined size of obstruction is greater than a threshold, modifying
interface of remote operator to display overlay notification indicating
obstruction
540

In time to impact is less then second threshold, modifying interface of remote
operator display overlay notification indicating obstruction and causing
interface to emit an audible notification indicating obstruction
550

FIG. 5

OFF-ROAD MACHINE-LEARNED OBSTACLE NAVIGATION IN AN AUTONOMOUS VEHICLE ENVIRONMENT

CROSS REFERENCE TO RELATED APPLICATIONS

This application is a divisional of U.S. application Ser. No. 16/953,774, filed Nov. 20, 2020, now U.S. Pat. No. 11,906,974, which is incorporated by reference in its entirety.

TECHNICAL FIELD

The disclosure generally relates to the field of autonomous off-road vehicles, and specifically to navigation within an off-road environment by an autonomous off-road vehicle.

BACKGROUND

Autonomous vehicles in off-road environments encounter different obstacles while navigating than autonomous road vehicles. Generally, when autonomous road vehicles encounter obstacles, they are required to avoid the obstacles at all costs in order to reduce damage to the vehicle or obstacle. However, in an off-road context, autonomous vehicles often can ignore encountered obstacles so long as doing so is unlikely to result in damage. Human operators of off-road vehicles can often quickly decide whether or not to ignore obstacles based on judgment and experience. However, autonomous vehicles often encounter unknown obstacles (e.g., obstacles that haven't previously been encountered or identified, or obstacles of different dimensions than previously encountered), and there is a need for the vehicle to autonomously decide whether or not the unknown obstacle can be ignored.

SUMMARY

An autonomous off-road vehicle ("AOV"), while navigating a route within an off-road environment, identifies an obstacle obstructing the route. For instance, the AOV can detect a mound of mulch or a pile of cinderblocks while driving around a job site, using a vehicle-mounted camera or LIDAR. The AOV can apply a classifier (such as a first machine-learned model) to sensor data representative of the obstruction to attempt to classify the obstruction. If the obstruction can be identified, the vehicle can determine whether or not the obstruction can be ignored, and thus whether or not the route needs to be modified before the vehicle proceeds.

In the event that the classifier is unable to identify the obstruction, the AOV can apply a model (such as a second machine-learned model) to the sensor data representative of the obstruction. The model can be trained on data representative of previous interactions between AOVs and obstructions. For instance, the training data can include dimensions of the obstruction or the vehicle, a result of a collision with the obstruction (e.g., an amount or type of damage to the vehicle or the obstruction), a speed of the vehicle at the time of collision, and the like. The model can indicate whether or not the obstruction can be ignored by the AOV. If the obstruction can be ignored, the AOV can continue to navigate along the route. If the obstruction can't be ignored, the AOV can perform one of a variety of actions based on, for instance, a speed of the vehicle, a proximity of the vehicle to the obstruction, an estimated time to collision, the dimensions of the obstruction, and the like. Actions that can be performed by the AOV include reducing a speed of the vehicle, stopping the vehicle, emitting an audible warning by the vehicle, generating a notification for display by an interface of a remote operator, displaying a video feed captured by a vehicle camera on the interface, emitting an audible or graphical warning to the remote operator, and the like.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure (FIG. 1 illustrates an autonomous off-road vehicle system environment, according to various embodiments.

FIG. 4 is a flow chart illustrating a process for navigating an autonomous off-road vehicle, according to various embodiments.

FIG. 5 is a flow chart illustrating a process for interacting with an obstacle detected by an autonomous off-road vehicle, according to various embodiments.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed. Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Autonomous Off-Road Vehicle Navigation Overview

The methods described herein use machine learning to enable an autonomous off-road vehicle (AOV) to navigate within an off-road environment. Examples of off-road environments include building or road construction sites, job sites, demolition sites, agricultural sites or fields, forest or wooded sites, hill or mountain trails or sites, or any other location that includes at least partially unpaved areas or areas without paved roadway. Examples of off-road vehicles include tractors, excavators, bulldozers, transport vehicles, delivery vehicles, farming vehicles, or other vehicles configured to operate in an off-road context (e.g., on surfaces other than paved roadway). As used herein, "autonomous" refers to the ability of the off-road vehicle to operate without constant human supervision, for instance enabling the off-road vehicle to move, navigate, perform a function, and/or make a decision without explicitly receiving instructions from a human operator.

While navigating such off-road environments, an AOV may encounter an obstacle within the off-road environment. As used herein, "obstacle" refers to any object, thing, or entity that may interfere with the ability of the AOV to navigate within the off-road environment. For instance, the AOV may encounter a dirt pile while navigating within a construction site, may encounter a log while navigating in a forest, or may encounter a mud puddle or ditch while navigating within a field. Some obstacles can be ignored by the AOV without consequence (e.g., without causing damage to the AOV or the obstacle, or without significantly interfering with the ability of the AOV to navigate or perform a function). Other obstacles may result in damage or impairment if the AOV collides with the obstacles.

Figure 1:
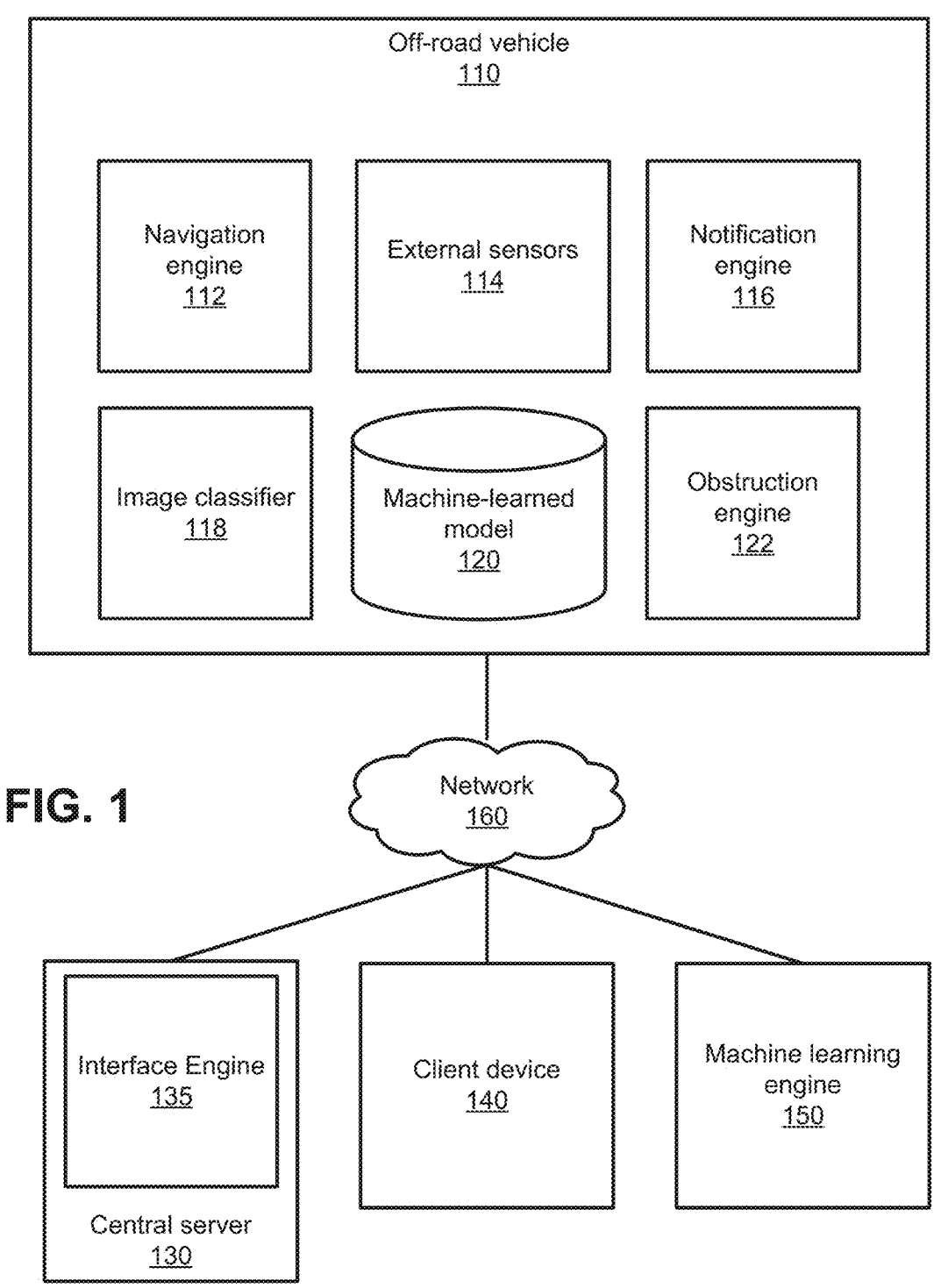

Figure (FIG. 1 illustrates an autonomous off-road vehicle system environment, according to various embodiments. The environment 100 of FIG. 1 includes an off-road vehicle 110 ("AOV" or simply "vehicle" hereinafter), a central server 130, a client device 140, and a machine learning engine 150, each communicatively coupled via a network 160. It should be noted that in other embodiments, the environment 100 may include different, fewer, or additional components than those illustrated in FIG. 1. For instance, the machine learning engine 150 may be implemented within the central server 130, or may be included within the AOV 110. Likewise, the client device 140 and the central server 130 can be the same device.

The off-road vehicle 110 of FIG. 1 includes a navigation engine 112, external sensors 114, a notification engine 116, an image classifier 118, a machine-learned model database 120, and an obstruction engine 122. In other embodiments, the AOV 110 includes fewer, different, or additional components than those illustrated in FIG. 1. Other components, such as engines, drivetrains, communication components, and the like aren't illustrated for the purposes of simplicity.

The navigation engine 112 enables the AOV 110 to autonomously navigate within the environment 100. For instance, the navigation engine 112 can, in response to identifying a task or function to be performed by the AOV 110, identify a location associated with the identified task or function, and can select a route from a current location of the AOV to the identified location. For instance, the AOV 110 can query a map associated with the environment 100, and can select a route from the current location of the AOV to the identified location associated with the task or function to be performed. The selected route can be the shortest distance between the locations, can be selected to avoid one or more obstacles, or can be selected based on a type of terrain between the current location of the AOV 110 and the identified location associated with the task or function. Upon selecting a route, the navigation engine 112 provides one or more navigation instructions to navigation components of the AOV 110 (such as an engine, a drivetrain, a steering mechanism, and the like, not illustrated in FIG. 1) to enable the AOV to autonomously navigate the route from the current location of the AOV to the identified location.

The navigation instructions provided by the navigation engine 112 to the AOV 110 can be selected based on information captured by the external sensors 114. The captured information can include information representative of the surroundings the AOV 110, representative of a state of the AOV, representative of objects, vehicles, or obstructions within a threshold proximity of the AOV, and the like. The sensors 114 can include cameras (such as a 3D camera or camera array), a LIDAR system, a RADAR system, depth sensors, proximity detectors, or any other component configured to detect one or more of a presence of objects or things within a proximity of the AOV 110, dimensions of any detected objects or things, a type of material within a proximity of the AOV, movement information representative of the AOV or any detected objects or things, and the like. The external sensors 114 can be mounted on an external surface or appendage of the AOV 110, can be located within the AOV, can be coupled to an object or surface external to the AOV, or can be mounted to a different vehicle.

The notification engine 116 is configured to generate one or more notifications based on a state of the AOV 110, based on detected obstructions within a threshold proximity of the AOV, based on a route being navigated by the AOV, based on a function being performed by the AOV, or based on any other information associated with the operation of the AOV. The notification engine 116 can provide the generated notifications to the central server 130, which (as described below) can provide the notifications to a client device 140 of a remote human operator for display. In some embodiments, the notifications include instructions for how the notification is to be displayed, what information the notification includes, and the like. The notification engine 116 includes information to be displayed within the provided notification, such as information representative of an identified obstruction (such as dimensions of the obstruction or a material making up the obstruction), information representative of a speed of the AOV 110, information representative of a location of the obstruction or the AOV, information representative of a time to collision with the obstruction, and the like.

The image classifier 118 is a classifier configured to attempt to identify a type of obstruction detected by the AOV 110. For instance, the AOV 110 can capture images of an obstruction within a threshold proximity of the AOV, and can use the image classifier 118 to determine what the obstruction is. In some embodiments, the image classifier 118 is trained on a training corpus of tagged images, and is configured to perform one or more computer vision operations generated based on the training. In some embodiments, the image classifier 118 is a machine-learned model trained based on a training set of data that includes images and an identity of objects, things, or entities present within the images. In some embodiments, the image classifier 118 is an algorithm (such as a computer vision algorithm) or is configured to detect an identity of objects using one or more perception sensors of the AOV 110 (e.g., cameras, depth sensors, and the like).

The machine-learned model database 120 includes one or more machine-learned models configured to identify obstructions and/or configured to determine whether or not the AOV 110 can ignore detected obstructions. The application of these machine-learned models is described below in greater detail. The machine-learned model database 120 can receive the machine-learned models from the machine learning engine 150, for instance periodically, in advance of the operation of the AOV 110, or in response to a request from the AOV.

The obstruction engine 122 is configured to detect obstructions within a proximity of the AOV 110 as the AOV navigates within the environment 100, and to evaluate whether or not the obstruction can be ignored while navigating. The obstruction engine 122 monitors data captured by the external sensors 114 in real-time in order to identify the presence of an obstruction within the environment 100. The obstruction engine 122 determines, in response to detecting the obstruction, whether the obstruction is obstructing a route being navigated by the AOV 110. For instance, the obstruction engine 122 determines that the obstruction is obstructing the AOV 110 if the obstruction is located on or within a threshold distance of the route being navigated.

Upon determining that the obstruction is obstructing a route being navigated by the AOV 110, the obstruction engine 122 applies the image classifier 118 to attempt to identify a type of the obstruction. For instance, if the obstruction is a pile of leaves, the image classifier 118 may classify the obstruction as "leaf pile", and if the obstruction is a pallet of bricks, the image classifier may classify the obstruction as "bricks". If the image classifier 118 is able to successfully identify a type of the obstruction, the obstruction engine 122 is configured to determine whether or not the obstruction can be ignored. For instance, the obstruction engine 122 can determine that the leaf pile can be ignored, and can determine that the bricks cannot be ignored.

In some embodiments, the obstruction engine 122 can determine that an obstruction can be ignored based on a potential for damage to the AOV 110 or the obstruction if the AOV collides with the obstruction. For instance, if the obstruction is determined to be made of a material that would damage an exterior of the AOV 110 or that would be damaged by the AOV, the obstruction engine 122 can determine that the obstruction cannot be ignored. Likewise, if the obstruction is something unlikely to be significantly damaged by the AOV 110, the obstruction engine 122 can determine that the obstruction can be ignored. In some embodiments, the obstruction engine 122 can determine whether or not the obstruction can be ignored based on a type of the obstruction. In such embodiments, the obstruction engine 122 can query a look-up table or logic mapping obstruction types to "ignore" or "do not ignore", and can query the look-up table with an identified obstruction type to determine whether or not the obstruction can be ignored.

If the image classifier 118 is unable to determine a type of the obstruction, the obstruction engine 122 can apply a machine-learned model stored within the machine-learned model database 120 and configured to indicate whether or not the obstruction can be ignored. It should be noted that because in embodiments, the applied image classifier is a machine-learned model, the image classifier can be referred to herein as a "first machine-learned model", and the machine-learned model configured to indicate whether the obstruction can be ignored can be referred to herein as a "second machine-learned model".

In some embodiments, the obstruction engine 122 determines dimensions of the obstruction using information accessed from the external sensors 114. In such embodiments, the second machine-learned model can determine whether or not the obstruction can be ignored based on the dimensions of the obstruction. For example, if the obstruction exceeds one or more threshold dimensions, the second machine-learned model can determine that the obstruction cannot be ignored, and if the obstruction does not exceed the threshold dimensions, the second machine-learned model determines that the obstruction can be ignored. In other embodiments, the machine-learned model can determine whether or not the obstruction can be ignored based on (or based additionally on) a speed of the AOV 110, a distance between the AOV and the obstruction, a time until collision, and the like.

In some embodiments, the second machine-learned model is configured to determine a type or amount of damage that may result from a collision between the AOV 110 and the obstruction. For instance, based on collision data from the training data described herein, the second machine-learned model can identity or quantify damage that is likely to result from such a collision, and can determine whether or not the obstruction can be ignored based on the type or amount of damage. For example, if the second machine-learned model determines that the AOV 110 is likely to suffer only minor damage to an exterior of the AOV, and that the cost of modifying the route being navigated by the AOV is greater than a cost of the minor damage, the second machine-learned model can indicate that the obstruction can be ignored. Likewise, if the second machine-learned model determines that the AOV 110 is likely to suffer suspension damage from a collision with the obstruction, the second machine-learned model can indicate that the obstruction cannot be ignored.

In some embodiments, the second machine-learned model is configured to determine a likelihood that an above-threshold amount of damage will result from a collision between the AOV 110 and the obstruction. In such embodiments, the second machine-learned model can compare the determined likelihood to a likelihood threshold, and can indicate whether or not the obstruction can be ignored based on the comparison. For example, if the likelihood of an above-threshold amount of damage exceeds the likelihood threshold, the second machine-learned model can indicate that the obstruction cannot be ignored, and vice versa. In various embodiments, both the damage threshold and the likelihood threshold can be default thresholds, can be established by a user or remote operator of the AOV 110, can be based on a context or use of the AOV, or can be based on any other suitable criteria.

If the obstruction engine 122 determines that the obstruction can be ignored, the AOV 110 continues navigating along the obstructed route with modification. If the obstruction engine 122 determines that the obstruction cannot be ignored, the obstruction engine 122 can perform one or more corrective actions. In some embodiments, the obstruction engine 122 modifies a route being navigated by the AOV 110 in order to avoid the obstruction. In some embodiments, the obstruction engine 122 slows or stops the AOV 110 (e.g., via the navigation engine 112). In some embodiments, the obstruction engine 122 generates a notification (e.g., via the notification engine 116) for display to a remote operator, informing the remote operator of the obstruction, warning the remote operator of the potential collision, providing information to the remote operator identifying a time until collision and/or of the location of the obstruction, providing the remote operator with a real-time video feed captured by the external sensors 114, emitting an audible warning to the remote operator, prioritizing the notification within a feed or display of the remote operator, or any other suitable information.

The central server 130 is a computing system located remotely from the AOV 110. In some embodiments, the central server is a web server or other computer configured to receive data from and/or send data to one or more autonomous vehicles within the environment 100. In some embodiments, the central server 130 receives information from the AOV 110 and other vehicles indicating a location of the vehicles, a function or operation being performed by the vehicles, a state of the one or more vehicles, and the like. In some embodiments, the central server 130 receives information describing the surroundings of the AOV 110, including a location of objects (such as an obstruction) location within a threshold proximity of the AOV 110. In some embodiments, the central server 130 receives a real-time feed of data from the AOV 110, such as a real-time video feed of the environment surrounding the AOV. In some embodiments, the central server 130 can provide information to the AOV 110, such as an instruction to perform an operation or function, a navigation instruction (such as a route), and the like. It some embodiments, the central server 130 can enable a remote operator to assume manual control of the AOV 110, and provide manual navigation or operation instructions to the AOV.

The central server 130 includes an interface engine 135 configured to generate one or more interfaces for viewing by a user (such as a user of the central server 130 or a user of the client device 140). The user can be a remote operator of the AOV 110, can be an individual associated with the environment 100 (such as a site foreman or a landowner), can be an individual associated with the AOV 110 (such as a repairman, an on-site coordinator, or the like), or can be any other suitable individual. The interface engine 135 can be used by a user to provide one or more instructions to an AOV 110, such as navigation instructions, route modification instructions, obstruction "ignore" or "do not ignore" instructions, operation or function instructions, remote piloting instructions, and the like.

The interface engine 135 can generate a user interface displaying information associated with the AOV 110, other vehicles, or the environment 100. For instance, the user interface can include a map illustrating a location and/or movement of each AOV 110 within a site, and/or a location of objects, structures, things, and entities within the site. The user interface can illustrate a function or operation being performed by each AOV 110 within the site, a state or characteristics of each AOV within the site, and any obstructions located within the site. The user interface can also display notifications generated by and/or received from an AOV 110, for instance within a notification feed, as pop-up windows, using icons within the map interface, and the like. In some embodiments, the user interface can present a warning to a user, such as a visual or audio warning, indicating that an obstruction is detected by an AOV 110, or that collision with the AOV is imminent, that a collision has occurred, that a functionality or capability of the AOV is impaired, and the like. By communicatively coupling to multiple AOVs 110, the central server 130 beneficially enables one user to track, monitor, and/or control multiple AOVs simultaneously.

The client device 140 is a computing device, such as a computer, a laptop, a mobile phone, a tablet computer, or any other suitable device configured to receive information from or provide information to the central server 130. The client device 140 includes a display configured to receive information from the interface engine 135, for instance generating user interfaces that include information representative of one or more AOVs 110 or the environment 100. The client device 140 can also generate notifications (such as notifications generated by an AOV 110) for display to a user, such as text message or operating system notifications. The client device 140 can include input mechanisms (such as a keypad, a touch-screen monitor, and the like), enabling a user of the client device to provide instructions to an AOV 110 (via the central server 130). It should be noted that although the client device 140 is described herein as coupling to an AOV 110 via the central server 130, in practice, the client device 140 may communicatively couple directly to the AOV (enabling a user to receive information from or provide instructions to the AOV without going through the central server).

The machine learning engine 150 is configured to access or generate one or more sets of training data, and to train one or more machine-learned models based on the training data. In some embodiments, the machine learning engine 150 trains the first machine-learned model (e.g., the image classifier 118) and the second machine-learned model (e.g., the model configured to indicate whether or not an obstruction can be ignored). The machine learning engine 150 can access the training data from one or more AOVs 110, the central server 130, the client device 140, or any other suitable data source. Upon training the machine-learned models, the machine learning engine 150 can provide the machine-learned models to the central server 130 for storage and/or distribution to one or more AOVs 110, or can provide the machine-learned models directly to the AOVs. Although illustrated as a standalone component in FIG. 1, the machine learning engine 160 can be implemented within a computing system, such as a server or a personal computer, or (as described above) can be implemented within the central server 130, the client device 140, or the AOV 110. The machine learning engine 150 is described in greater detail below with regards to FIG. 2.

As noted above, the systems of FIG. 1 are configured to communicate via a network 160, which may include any combination of local area and/or wide area networks, using both wired and/or wireless communication systems. In one embodiment, a network 160 uses standard communications technologies and/or protocols. For example, a network 160 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 160 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 160 may be represented using any suitable format, such as hypertext markup language (HTML) or extensible markup language (XML). In some embodiments, all or some of the communication links of a network 160 may be encrypted using any suitable technique or techniques.

It should be noted that although the obstacle detection and navigation operations described above with regards to the AOV 110, it should be noted that in practice, the obstacle detection and navigation operations can be implemented within a manually operated vehicle. For instance, a manually operated vehicle can detect an obstructed as the vehicle is being operated by a human operator. The vehicle can detect an obstruction within a path of the vehicle, for instance via a rear-view camera mounted to a rear or top surface of the vehicle.

The vehicle can apply a first machine-learned model or a classifier to the detected obstruction in order to identify a type of the obstruction. If the first machine-learned model or classifier is able to identify the type of the obstruction, the vehicle can determine whether or not the obstruction type can be ignored. In the event that the first machine-learned model is unable to identify a type of the obstruction, the vehicle can apply a second machine-learned model configured to determine whether or not the obstruction can be ignored, as described above.

The vehicle, in response to the first machine-learned model or the second machine-learned model identifying the obstruction and/or determining whether the obstruction can be ignored, can modify an interface of the vehicle presented to the human operator in order to indicate the presence of the obstruction to the human operator, to indicate a type of the obstruction, and/or to indicate whether or not the obstruction can be ignored. In some embodiments, the interface is a navigation interface (such as a rear-view camera interface) displaying a camera feed capturing an area within a proximity of the vehicle in real-time as the vehicle navigates within an area. Indicating the presence of an obstruction can include highlighting or displaying a box around a representation of the obstruction within the interface.

Indicating a type of the obstruction can include displaying text corresponding to the obstruction within the interface within a threshold distance of a representation of the obstruction within the interface. Likewise, indicating that the obstruction can or cannot be ignored can include displaying a particular color of bounding box around a representation of the obstruction (e.g., a red bounding box can indicate that the obstruction cannot be ignored while a yellow bounding box indicates that the obstruction can be ignored). In some embodiments, when the vehicle determines that an obstruction can't be ignored, the vehicle can emit an audible warning, can display a notification to the vehicle operator, or can modify a performance of the vehicle (e.g., by slowing the vehicle as the vehicle approaches the obstruction, or by stopping the vehicle if the vehicle comes within a threshold distance of the obstruction).

Training and Application of Machine-Learned Models

Figure 2:
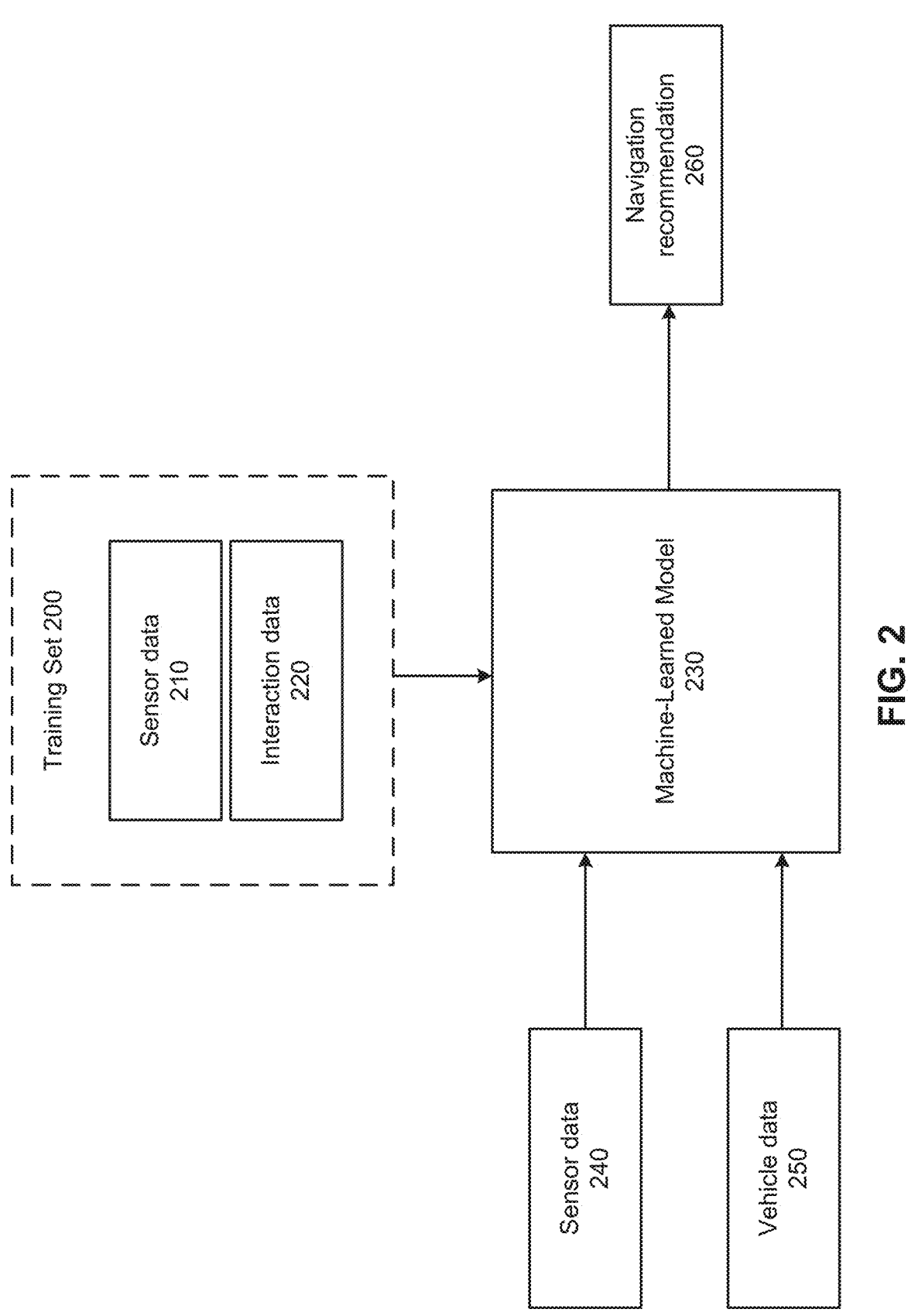
FIG. 2 illustrates the training and application of a machine-learned navigation model, according to various embodiments.

FIG. 2 illustrates the training and application of a machine-learned navigation model, according to various embodiments. In the embodiment of FIG. 2, the machine learning engine 150 generates or accesses a training set of data 200 ("training set 200"), which includes sensor data 210 and interaction data 220. The training set 200 can include data representative of historical encounters between autonomous off-road vehicles and obstructions, for instance instances where an AOV identified an obstruction, collided with or navigated through the obstruction, and captured sensor information representative of the obstruction and information representative of the interaction between the AOV and the obstruction.

As noted above, the sensor data 210 includes information representative of an obstruction previously or historically encountered by an AOV, such as image or video data captured by cameras, depth information (such as LIDAR data), material information (e.g., information describing what an obstruction is made of), dimension information describing one or more dimensions of an obstruction, and the like. As also noted above, the interaction data can include information representative of a previous or historical interaction (such as a collision) between an AOV and an obstruction, including a type or amount of damage to the AOV or the obstruction, one or more functionalities or capabilities of the AOV affected by the collision, a speed or state of the AOV or the obstruction at the time of collision, and the like. The machine learning engine 150 can access the training set 200 in advance of training the machine-learned models, in response to a request for a machine-learned model, and the like.

The machine learning engine 150 trains one or more machine-learned models, such as a model configured to indicate whether or not an obstruction can be ignored, using the training set 200. It should be note that the machine learning engine 150 can use any of a number of machine learning operations to train the machine-learned model 230. For example, the machine-learned model includes one or more of: a linear support vector machine (linear SVM), boosting for other algorithms (e.g., AdaBoost), a neural network, a logistic regression, a naïve Bayes classifier, a memory based learning, a random forest, a bagged tree, a decision tree, a boosted tree, or a boosted stump.

The machine-learned model 230 is applied to sensor data 240 representative of a detected obstruction and vehicle data 250 representative of the AOV 110. The machine-learned model, based on the sensor data 240 and the vehicle data 250 determines whether or not the obstruction can be ignored as the AOV 110 is navigating. As described above, if the dimensions of the obstruction exceed a threshold, the machine-learned model can indicate that the obstruction cannot be ignored. Likewise, if a collision with the obstruction is likely to result in an above-threshold amount of damage or a particular type of damage, the machine-learned model can indicate that the obstruction cannot be ignored. Further, if a collision with the obstruction is more likely than a likelihood threshold to cause any damage or a particular type of damage or impairment, the machine-learned model can indicate that the obstruction cannot be ignored. In some embodiments, if one or more of these conditions are not satisfied, the machine-learned model 230 can indicate that the obstruction can be ignored.

In some embodiments, the machine-learned model 230 provides an indication of whether or not the obstruction can be ignored to other components of the AOV 110 or the environment 100. In addition, the machine-learned model 230 may output a navigation recommendation 260, indication how, if at all, a navigation of the AOV 110 can be modified based on the obstruction. For instance, the machine-learned model 230 may output an indication that the route being navigated by the AOV 110 needs to be changed to avoid the obstruction, or may output an indication that AOV can continue navigating the route without change (e.g., in response to a determination that the obstruction can be ignored). In other embodiments, the machine-learned model can generate a notification or information for inclusion in a notification by the notification engine 116.

Example Autonomous Off-Road Vehicle Embodiments

Figure 3A:
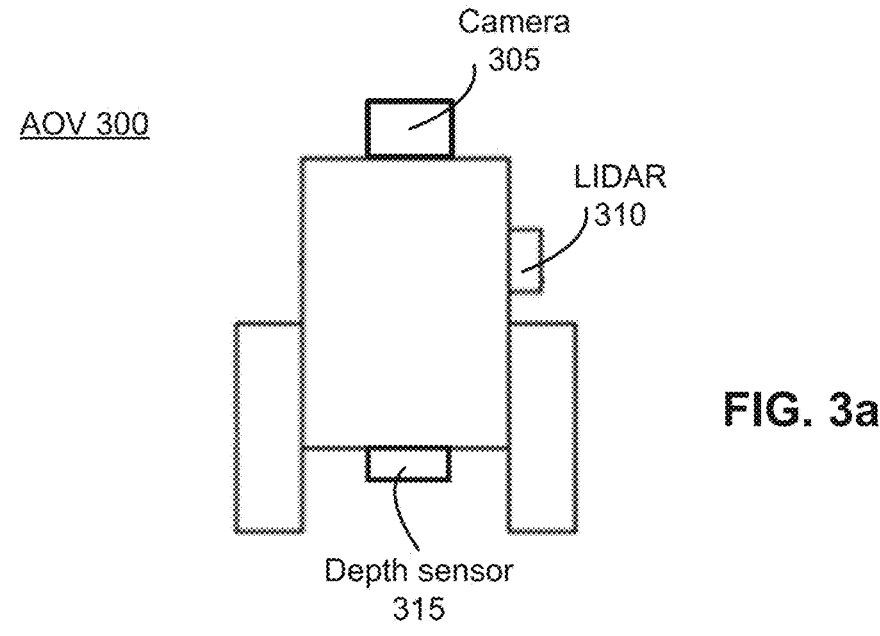
FIG. 3A illustrates an example autonomous off-road vehicle, according to various embodiments.

FIG. 3A illustrates an example autonomous off-road vehicle, according to various embodiments. In the example of FIG. 3A, the AOV 300 includes multiple external sensors: a camera 305, a LIDAR 310, and a depth sensor 315. In other embodiments, the AOV 300 can include different, fewer, or additional external sensors, oriented or arranged on the AOV in different positions than illustrated in FIG. 3A. It should be noted that although the sensors are referred to as "external sensors", in practice, the sensors can be integrated within the AOV, implemented within a surface of the AOV, and the like. The external sensors gather data representative of the surroundings of the AOV 300, for instance an obstacle within a proximity of the AOV.

The AOV 300 can first detect the obstacle, for instance using the camera 305. For instance, the AOV 300 can determine from images captured by the camera 305 that the obstacle is located on a route being navigated by the AOV. Upon detecting the obstacle, the AOV 300 can attempt to identify the obstacle, for instance by applying an image classifier to the images of the obstacle captured by the camera 305. If the image classifier is unable to identify the obstacle, the AOV 300 can use one or both of the LIDAR 310 and the depth sensor 315 to determine the dimensions of the obstacle. The AOV 300 can apply a machine-learned model to the determined dimensions in order to determine whether or not the obstacle can be ignored. If the obstacle can be ignored, the AOV 300 can continue to navigate along the route, unobstructed. If the obstacle can't be ignored, the AOV 300 can modify the route being navigated, can notify a remote operator, or can perform any of the obstacle-avoidance operations described herein.

Figure 3B:
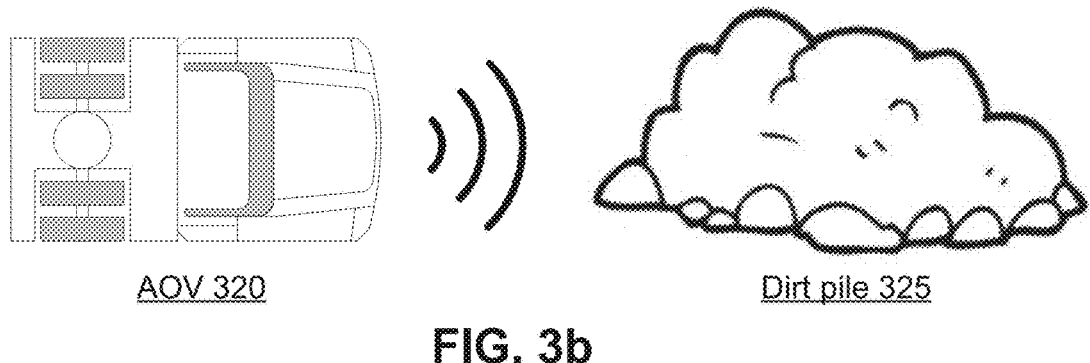
FIGS. 3B and 3C illustrate example encounters between an autonomous off-road vehicle and an obstacle, according to various embodiments.
Figure 3C:
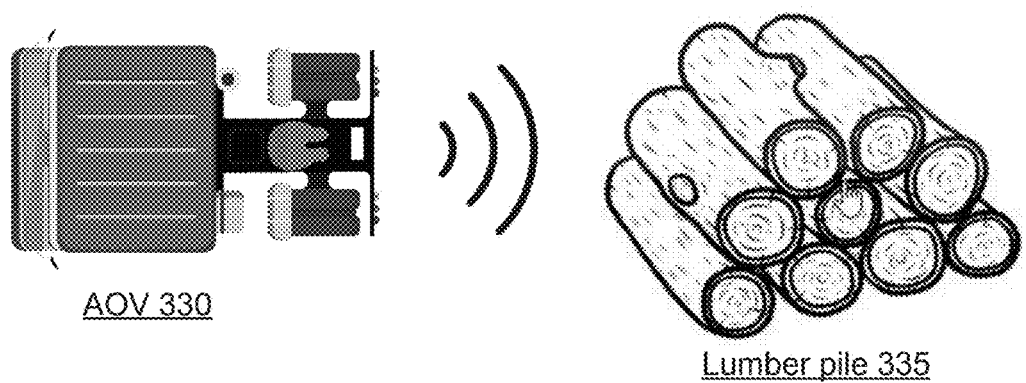

FIGS. 3B and 3C illustrate example encounters between an autonomous off-road vehicle and an obstacle, according to various embodiments. In the embodiment of FIG. 3B, the AOV 320 detects a dirt pile 325. The AOV 320 is unable to identify the dirt pile 325 using an image classifier, but applies a machine-learned model to the dimensions of the dirt pile. The machine-learned model indicates that the dirt pile 325 can be ignored, and in response, the AOV 320 continues to navigate through the dirt pile without changing course.

In the embodiment of FIG. 3C, the AOV 330 detects a lumber pile 335 within a path of the AOV while the AOV is backing up. The AOV 330 is unable to identify the lumber pile 335 using an image classifier, and instead applies a machine-learned model to the dimensions of the lumber pile. The machine-learned model indicates that the lumber pile 335 cannot be ignored, and in response, the AOV 330 stops backing up prior to colliding with the lumber pile in order to avoid damaging the AOV.

Processes for Navigating an Autonomous Off-Road Vehicle

FIG. 4 is a flow chart illustrating a process for navigating an autonomous off-road vehicle, according to various embodiments. It should be noted that the process illustrated herein can include fewer, different, or additional steps in other embodiments.

A route is navigated 410 by an autonomous off-road vehicle from a first location to a second location within an off-road environment. An obstruction is identified 420 as obstructing the route being navigated by the vehicle. The vehicle, in response to identifying the obstruction, applies 430 a first machine-learned model to sensor data (such as image data) representative of the obstruction.

If the image classifier can identify the obstruction, the autonomous off-road vehicle can continue to navigate 440 the route in response to determining that the obstruction can be ignored. Likewise, the vehicle can modify 450 the route in response to determining that the obstruction cannot be ignored in order to avoid the obstruction. In response to the first machine-learned model being unable to classify the obstruction, a second machine-learned model is applied 460 to determine whether or not the obstruction can be ignored, for instance based on dimensions of the obstruction.

FIG. 5 is a flow chart illustrating a process for interacting with an obstacle detected by an autonomous off-road vehicle, according to various embodiments. It should be noted that the process illustrated herein can include fewer, different, or additional steps in other embodiments.

If an autonomous off-road vehicle determines that an obstruction cannot be ignored, the vehicle determines 510 a time to impact with the obstruction, for instance based on a distance between the obstruction and the vehicle and based on a speed of the vehicle. If the time to impact is greater than a first threshold, an indication of the obstruction can be displayed 520 within an interface of a remote operator, for instance along with a determined time to impact the obstruction.

If the time to impact is less than a first threshold but greater than a second threshold, and if the determined size of the obstruction is less than a threshold size, the interface of the remote operator is modified 530 to include a real-time video feed of the obstruction captured by the vehicle.

If the time to impact is less than a first threshold but greater than a second threshold, and if the determined size of the obstruction is greater than a threshold, the interface of the remote operator is modified 540 in order to display a notification indicating the obstruction, for instance overlaid over an interface displayed to the user.

If the time to impact is less than a second threshold the interface of a remote operator is modified 550 in order to display a notification indicating the obstruction, and is configured to emit an audible notification or warning indicating the obstruction.

Additional Configuration Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like.

Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method for autonomously navigating an autonomous off-road vehicle, comprising:

while autonomously navigating along a route, identifying, by the autonomous off-road vehicle, an obstruction obstructing the route;

determining, by the autonomous off-road vehicle, a confidence score representative of whether the obstruction can be ignored as the autonomous off-road vehicle navigates along the route such that if the confidence score is greater than a first threshold, the obstruction cannot be ignored and if the confidence score is less than a second threshold, the obstruction can be ignored; and in response to the confidence score being less than the first threshold and greater than the second threshold, applying, by the autonomous off-road vehicle, a machine-learned model to sensor data representative of the obstruction, the machine-learned model configured to indicate whether the obstruction can be ignored or cannot be ignored.

2. The method of claim 1, wherein the confidence score is determined based on one or more of a type of the obstruction, a size of the obstruction, and dimensions of the obstruction.

3. The method of claim 1, wherein the machine-learned model comprises a neural network trained on previous interactions between a similar autonomous off-road vehicle and obstructions.

4. The method of claim 1, wherein the autonomous off-road vehicle is configured to perform an action based on the indication from the machine-learned model.

5. The method of claim 4, wherein the action performed by the autonomous off-road vehicle comprises one or more of: reducing a speed of the autonomous off-road vehicle, stopping the autonomous off-road vehicle, modifying the route the autonomous off-road vehicle is navigating, modifying an interface of a remote operator to indicate the obstruction, sending a notification indicating the obstruction to a device of the remote operator, and emitting a warning noise to the remote operator indicative of the obstruction.

6. The method of claim 1, wherein the machine-learned model is trained based on a set of training data representative of interactions between vehicles and obstructions, wherein the set of training data includes information describing a change in a condition of one or both of a vehicle and an obstruction with which the vehicle interacted.

7. The method of claim 1, wherein the sensor data is depth data captured by a depth-sensing system of the autonomous off-road vehicle.

8. An autonomous off-road vehicle comprising a hardware processor and a non-transitory computer-readable storage medium storing executable instructions that, when executed by the hardware processor, cause the autonomous off-road vehicle to perform steps comprising:

while autonomously navigating along a route, identifying an obstruction obstructing the route;

determining a confidence score representative of whether the obstruction can be ignored as the autonomous off-road vehicle navigates along the route such that if the confidence score is greater than a first threshold, the obstruction cannot be ignored and if the confidence score is less than a second threshold, the obstruction can be ignored; and in response to the confidence score being less than the first threshold and greater than the second threshold, applying a machine-learned model to sensor data representative of the obstruction, the machine-learned model configured to indicate whether the obstruction can be ignored or cannot be ignored.

9. The autonomous off-road vehicle of claim 8, wherein the confidence score is determined based on one or more of a type of the obstruction, a size of the obstruction, and dimensions of the obstruction.

10. The autonomous off-road vehicle of claim 8, wherein the machine-learned model comprises a neural network trained on previous interactions between a similar autonomous off-road vehicle and obstructions.

11. The autonomous off-road vehicle of claim 8, wherein the autonomous off-road vehicle is configured to perform an action based on the indication from the machine-learned model.

12. The autonomous off-road vehicle of claim 11, wherein the action performed by the autonomous off-road vehicle comprises one or more of: reducing a speed of the autonomous off-road vehicle, stopping the autonomous off-road vehicle, modifying the route the autonomous off-road vehicle is navigating, modifying an interface of a remote operator to indicate the obstruction, sending a notification indicating the obstruction to a device of the remote operator, and emitting a warning noise to the remote operator indicative of the obstruction.

13. The autonomous off-road vehicle of claim 8, wherein the machine-learned model is trained based on a set of training data representative of interactions between vehicles and obstructions, wherein the set of training data includes information describing a change in a condition of one or both of a vehicle and an obstruction with which the vehicle interacted.

14. The autonomous off-road vehicle of claim 8, wherein the sensor data is depth data captured by a depth-sensing system of the autonomous off-road vehicle.

15. A non-transitory computer-readable storage medium storing executable instructions that, when executed by a hardware processor, cause an autonomous off-road vehicle to perform steps comprising:

while autonomously navigating along a route, identifying an obstruction obstructing the route;

determining a confidence score representative of whether the obstruction can be ignored as the autonomous off-road vehicle navigates along the route such that if the confidence score is greater than a first threshold, the obstruction cannot be ignored and if the confidence score is less than a second threshold, the obstruction can be ignored; and in response to the confidence score being less than the first threshold and greater than the second threshold, applying a machine-learned model to sensor data representative of the obstruction, the machine-learned model configured to indicate whether the obstruction can be ignored or cannot be ignored.

16. The non-transitory computer-readable storage medium of claim 15, wherein the confidence score is determined based on one or more of a type of the obstruction, a size of the obstruction, and dimensions of the obstruction.

17. The non-transitory computer-readable storage medium of claim 15, wherein the machine-learned model comprises a neural network trained on previous interactions between a similar autonomous off-road vehicle and obstructions.

18. The non-transitory computer-readable storage medium of claim 15, wherein the instructions further cause the autonomous off-road vehicle to perform a step comprising:

performing an action based on the indication from the machine-learned model.

19. The non-transitory computer-readable storage medium of claim 18, wherein the action performed by the autonomous off-road vehicle comprises one or more of: reducing a speed of the autonomous off-road vehicle, stopping the autonomous off-road vehicle, modifying the route the autonomous off-road vehicle is navigating, modifying an interface of a remote operator to indicate the obstruction, sending a notification indicating the obstruction to a device of the remote operator, and emitting a warning noise to the remote operator indicative of the obstruction.

20. The non-transitory computer-readable storage medium of claim 15, wherein the machine-learned model is trained based on a set of training data representative of interactions between vehicles and obstructions, wherein the set of training data includes information describing a change in a condition of one or both of a vehicle and an obstruction with which the vehicle interacted.

\* \* \* \* \*